(12) United States Patent
Liu et al.

(10) Patent No.: US 11,942,979 B2
(45) Date of Patent: Mar. 26, 2024

(54) NETWORK RADIO FREQUENCY STRUCTURE, RADIO FREQUENCY CONTROL METHOD, AND ELECTRONIC DEVICE

(71) Applicant: VIVO MOBILE COMMUNICATION CO., LTD., Guangdong (CN)

(72) Inventors: Binbin Liu, Guangdong (CN); Jie Qiu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 83 days.

(21) Appl. No.: 17/687,348

(22) Filed: Mar. 4, 2022

(65) Prior Publication Data

US 2022/0190870 A1 Jun. 16, 2022

Related U.S. Application Data

(63) Continuation of application No. PCT/CN2020/103321, filed on Jul. 21, 2020.

(30) Foreign Application Priority Data

Sep. 6, 2019 (CN) .......................... 201910841492.X

(51) Int. Cl.
*H04B 1/44* (2006.01)
*H04B 1/401* (2015.01)
(52) U.S. Cl.
CPC ............... *H04B 1/44* (2013.01); *H04B 1/401* (2013.01)
(58) Field of Classification Search
CPC .................................. H04B 1/401; H04B 1/44
See application file for complete search history.

(56) References Cited

U.S. PATENT DOCUMENTS

2013/0244720 A1 9/2013 Hsia et al.
2017/0179997 A1* 6/2017 Liao .................... H04B 1/44
(Continued)

FOREIGN PATENT DOCUMENTS

CN 105577224 A 5/2016
CN 106209267 A 12/2016
(Continued)

OTHER PUBLICATIONS

The First Office Action of Priority Application No. CN 201910841492.X issued by the Chinese Patent Office dated Dec. 3, 2020.
(Continued)

*Primary Examiner* — Nguyen T Vo
(74) *Attorney, Agent, or Firm* — IP & T GROUP LLP

(57) ABSTRACT

A network radio frequency structure includes: a radio frequency transceiver; a first radio frequency module connected to the radio frequency transceiver, where the first radio frequency module is connected to a first antenna and a second antenna through a first DPDT switch; and a second radio frequency module connected to the radio frequency transceiver, where the second radio frequency module is connected to a third antenna and a fourth antenna through a first switch unit; where the first radio frequency module includes: a first transmitting module and a first receiving module, the first transmitting module is connected to a first interface of the first DPDT switch, and the first receiving module is connected to a second interface of the first DPDT switch.

3 Claims, 6 Drawing Sheets

(56) References Cited

U.S. PATENT DOCUMENTS

| | | | |
|---|---|---|---|
| 2019/0007072 A1* | 1/2019 | Yuan | H04W 88/06 |
| 2019/0288717 A1* | 9/2019 | Bai | H01Q 1/243 |
| 2019/0288732 A1* | 9/2019 | Bai | H04B 1/005 |
| 2020/0162937 A1 | 5/2020 | Chang et al. | |
| 2021/0345258 A1 | 11/2021 | Yang | |
| 2021/0351812 A1 | 11/2021 | Chen et al. | |

FOREIGN PATENT DOCUMENTS

| | | | |
|---|---|---|---|
| CN | 106656248 | * | 5/2017 |
| CN | 108092009 A | | 5/2018 |
| CN | 108258384 A | | 7/2018 |
| CN | 108270453 A | | 7/2018 |
| CN | 109474291 A | | 3/2019 |
| CN | 109802699 A | | 5/2019 |
| CN | 109861734 A | | 6/2019 |
| CN | 109962719 A | | 7/2019 |
| CN | 110149132 A | | 8/2019 |
| CN | 110572178 A | | 12/2019 |
| CN | 111130585 A | | 5/2020 |
| KR | 2001-0011831 A | | 2/2001 |

OTHER PUBLICATIONS

The Second Office Action of Priority Application No. CN 201910841492.X issued by the Chinese Patent Office dated Jun. 3, 2021.

International Search Report and Written Opinion of International Application No. PCT/CN2020/103321 issued by the Chinese Patent Office dated Sep. 30, 2020.

* cited by examiner

NETWORK RADIO FREQUENCY STRUCTURE, RADIO FREQUENCY CONTROL METHOD, AND ELECTRONIC DEVICE

CROSS-REFERENCE OF RELATED APPLICATIONS

This application is a Bypass Continuation Application of PCT/CN2020/103321 filed on Jul. 21, 2020, which claims priority to Chinese Patent Application No. 201910841492.X filed on Sep. 6, 2019, which are incorporated herein by reference in their entirety.

TECHNICAL FIELD

The present application relates to the field of communications technologies, and in particular, to a network radio frequency structure, a radio frequency control method, and an electronic device.

BACKGROUND

In the existing 5G architecture design, for example, N41, to perform related functions of N41 standalone (SA) 2T4R (2 channels of transmission and 4 channels of reception) and 1T4R (1 channel of transmission and 4 channels of reception) and non-standalone (NSA) 1T4R, N41 generally requires that 2 new radio (NR) transmitting modules are externally connected. In addition, to implement the NSA EN-DC (4G radio access network and 5G NR dual connectivity) mode, 4G needs a separate medium-and-high-frequency power amplifier, to perform a relevant sounding reference signal (SRS) function in EN-DC.

SUMMARY

According to a first aspect, an embodiment of the present application provides a network radio frequency structure, applied to an electronic device, including:
  a radio frequency transceiver;
  a first radio frequency module connected to the radio frequency transceiver, where the first radio frequency module is connected to a first antenna and a second antenna through a first double pole double throw (DPDT) switch; and
  a second radio frequency module connected to the radio frequency transceiver, where the second radio frequency module is connected to a third antenna and a fourth antenna through a first switch unit;
  where the first radio frequency module includes: a first transmitting module and a first receiving module, and the first transmitting module is connected to a first interface of the first DPDT switch; and the first receiving module is connected to a second interface of the first DPDT switch.

According to a second aspect, an embodiment of the present application further provides an electronic device, including the foregoing network radio frequency structure.

According to a third aspect, an embodiment of the present application further provides a radio frequency control method, applied to an electronic device. The electronic device includes a first radio frequency module and a second radio frequency module, and the method includes:
  controlling the first radio frequency module and the second radio frequency module to transmit a first signal and a second signal respectively; where the first radio frequency module transmits the first signal through a first antenna and a second antenna, and the second radio frequency module transmits the second signal through a third antenna and a fourth antenna; or
  controlling the second radio frequency module to transmit the first signal and the second signal.

According to a fourth aspect, an embodiment of the present application further provides an electronic device, including a first radio frequency module and a second radio frequency module, and further including:
  a control module, configured to control the first radio frequency module and the second radio frequency module to transmit a first signal and a second signal respectively; where the first radio frequency module transmits the first signal through a first antenna and a second antenna, and the second radio frequency module transmits the second signal through a third antenna and a fourth antenna; or
  control the second radio frequency module to transmit the first signal and the second signal.

According to a fifth aspect, an embodiment of the present application further provides an electronic device, including a processor, a memory, and a computer program stored in the memory and executable on the processor. When the computer program is executed by the processor, the steps of the foregoing radio frequency control method are implemented.

According to a sixth aspect, an embodiment of the present application further provides a non-transitory computer-readable storage medium. The non-transitory computer-readable storage medium stores a computer program, and when the computer program is executed by a processor, the steps of the foregoing radio frequency control method are implemented.

BRIEF DESCRIPTION OF DRAWINGS

To describe the technical solutions in embodiments of the present application more clearly, the following briefly describes the accompanying drawings required for describing the embodiments of the present application. Apparently, the accompanying drawings in the following description show merely some embodiments of the present application, and a person of ordinary skill in the art may still derive another drawing from these accompanying drawings.

Figure 1:
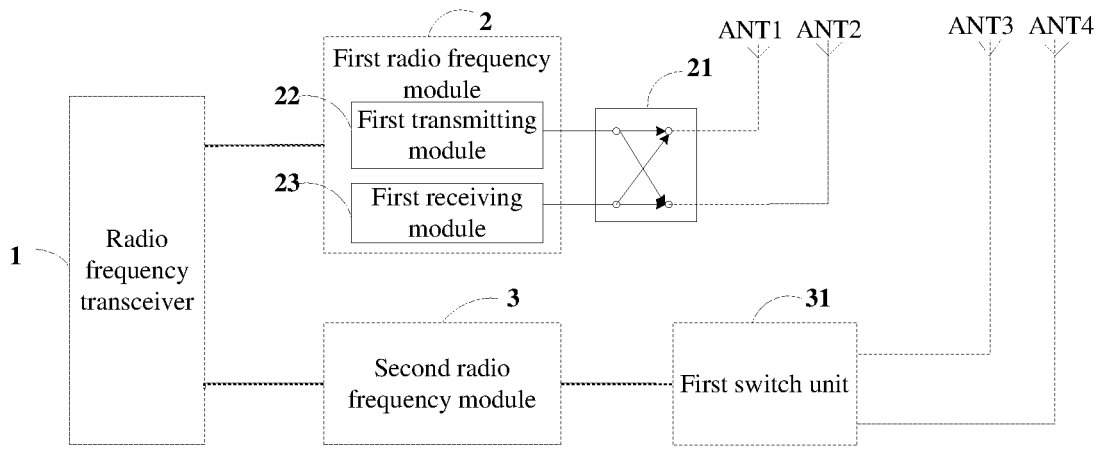
FIG. 1 is a schematic structural diagram 1 of a network radio frequency structure according to an embodiment of the present application.

Description of reference numerals: 1. Radio frequency transceiver, 2. First radio frequency module, 3. Second radio frequency module, 21. First DPDT switch, 22. First transmitting module, 23. First receiving module, 31. First switch unit, 32. Second transmitting module, 33. Second receiving module, 34. First transmitting submodule, 35. Second transmitting submodule, 36. First MIMO module, 37. Second MIMO module, 311. Second DPDT switch, 312. DP4T switch, 313. First SPDT switch, and 314. Second SPDT switch.

DETAILED DESCRIPTION OF THE EMBODIMENTS

Exemplary embodiments of the present application will be described below reference to the accompanying drawings. Although the exemplary embodiments of the present application are shown in the accompanying drawings, it should be understood that the present application may be implemented in various forms without being limited to the embodiments described herein. On the contrary, these embodiments are provided to enable a more thorough understanding of the present application and to convey the scope of the present application to those skilled in the art.

In a 5G radio frequency structure, a switch module is complex and includes multiple three pole three throw (3P3T) switches or double pole four throw (DP4T) switches. Therefore, insertion losses and costs are high, and there are a large number of antennas. As a result, design is complex, performance is poor, and a layout area is large.

As shown in FIG. 1, an embodiment of the present application provides a network radio frequency structure, applied to an electronic device and including:

a radio frequency transceiver 1; a first radio frequency module 2 connected to the radio frequency transceiver 1, where the first radio frequency module 2 is connected to a first antenna and a second antenna through a first double pole double throw (DPDT) switch 21; and a second radio frequency module 3 connected to the radio frequency transceiver 1, where the second radio frequency module 3 is connected to a third antenna and a fourth antenna through a first switch unit 31;

where the first radio frequency module 2 includes: a first transmitting module 22 and a first receiving module 23, the first transmitting module 22 is connected to a first interface of the first DPDT switch 21; and the first receiving module 23 is connected to a second interface of the first DPDT switch 21.

In this embodiment, the first radio frequency module 2 may be a long term evolution (LTE) radio frequency module. It should be noted that the first transmitting module 22 is a transmitting module that satisfies the transmitting functions of the LTE signal frequency band and the 5G signal frequency band (such as the N41 frequency band). The first receiving module 23 is a receiving module that satisfies receiving functions of the LTE signal frequency band and the 5G signal frequency band.

Figure 2:
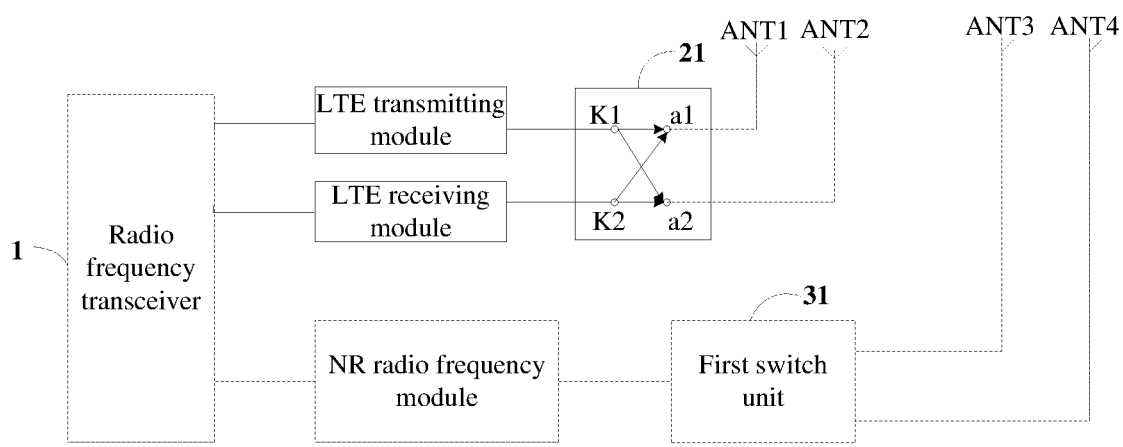
FIG. 2 is a schematic structural diagram 2 of a network radio frequency structure according to an embodiment of the present application.

As shown in FIG. 2, for example, the first transmitting module 22 is an LTE transmitting module and the first receiving module 23 is an LTE receiving module. The LTE transmitting module is connected to a first interface K1 of the first DPDT switch 21, and the LTE receiving module is connected to a second interface K2 of the first DPDT switch 21. A first contact a1 of the first DPDT switch 21 is connected to the first antenna ANT1, and a second contact a2 of the first DPDT switch 21 is connected to the second antenna ANT2. A signal sent by the radio frequency transceiver 1 can pass through the LTE transmitting module and the first DPDT switch 21 and is sent though ANT1 and ANT2.

The second radio frequency module 3 may be an NR radio frequency module. The signal sent by the radio frequency transceiver 1 can pass through the second radio frequency module 3 (that is, the NR radio frequency module) and the first switch unit 31, and is sent to the base station through the third antenna ANT3 and the fourth antenna ANT4.

It should be noted that during signal transmission, for example, a signal sent by the radio frequency transceiver 1 is a sounding reference signal (SRS). Standalone and non-standalone NR bands need to support a technology of 2T4R (2 channels of transmissions and 4 channels of reception) or 1T4R (1 channel of transmission and 4 channels of reception) that transmits SRSs by turns through antennas. 2T4R of SRS signals includes two channels of SRS signals. Because 2T4R of SRS signals includes two channels of SRS signals, optionally, a first channel of SRS signal passes through the first radio frequency module 2 (that is, the LTE radio frequency module) and the first DPDT switch 21, and is sent through ANT1 and ANT2. A second channel of SRS signal passes through the second radio frequency module 3 (that is, the NR radio frequency module) and the first switch unit 31, and is sent through ANT3 and ANT4. In this way, the network radio frequency structure implements 2T4R of SRS signals.

Optionally, for 2T4R of SRS signals, the two channels of SRS signals can also be sent through the second radio frequency module 3 (that is, the NR radio frequency module), that is, the second radio frequency module 3 sends the two channels of SRS signals through different antennas respectively by using the first switch unit 31.

1T4R of an SRS signal only needs to send one channel of SRS signal. Therefore, the SRS signal can pass through the second radio frequency module 3 and the first switch unit 31, and is sent through ANT3 and ANT4 and the other two antennas. Alternatively, the SRS signal passes through the first radio frequency module 2 and the first DPDT switch 21, and is sent through the ANT1 and ANT2. In addition, the SRS signal passes through the second radio frequency module 3 and the first switch unit 31 and is sent through the ANT3 and ANT4. It should be noted that the SRS signal needs to be transmitted through the first radio frequency module 2 and the second radio frequency module 3 at a preset time sequence. In this way, the network radio frequency structure implements 1T4R of an SRS signal.

Certainly, the first radio frequency module and the second radio frequency module in this embodiment may also be radio frequency modules in bands other than 4G LTE and 5G NR bands, which is not limited in this embodiment.

The embodiments of the present application simplify the network radio frequency structure, use a DPDT switch and a switch unit to replace a 3P3T switch or a DP4T switch, reduce switch insertion losses, and therefore improve the sensitivity of the radio frequency structure. In addition, switch logic is simple and the layout is flexible. At the same time, the SRS function and the antenna switching function of the network radio frequency structure can be performed.

Structural forms of the second radio frequency module 3 and the first switch unit 31 are described below with embodiments.

Figure 3:
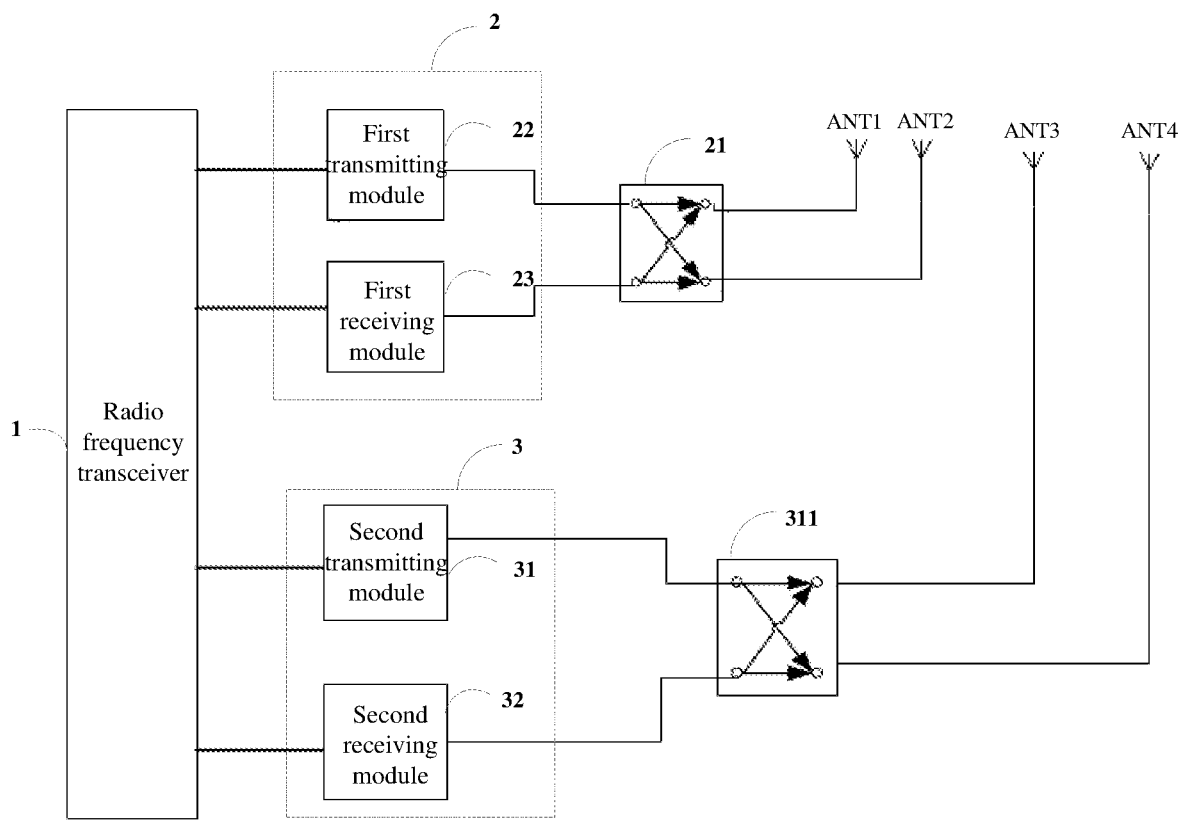
FIG. 3 is a schematic structural diagram 3 of a network radio frequency structure according to an embodiment of the present application.

In form 1, as shown in FIG. 3, optionally, the first switch unit 31 includes: a second DPDT switch 311.

The second radio frequency module 3 includes: a second transmitting module 32 and a second receiving module 33, the second transmitting module 32 is connected to a first interface of the second DPDT switch 311; and the second receiving module 33 is connected to a second interface of the second DPDT switch 311.

Figure 4:
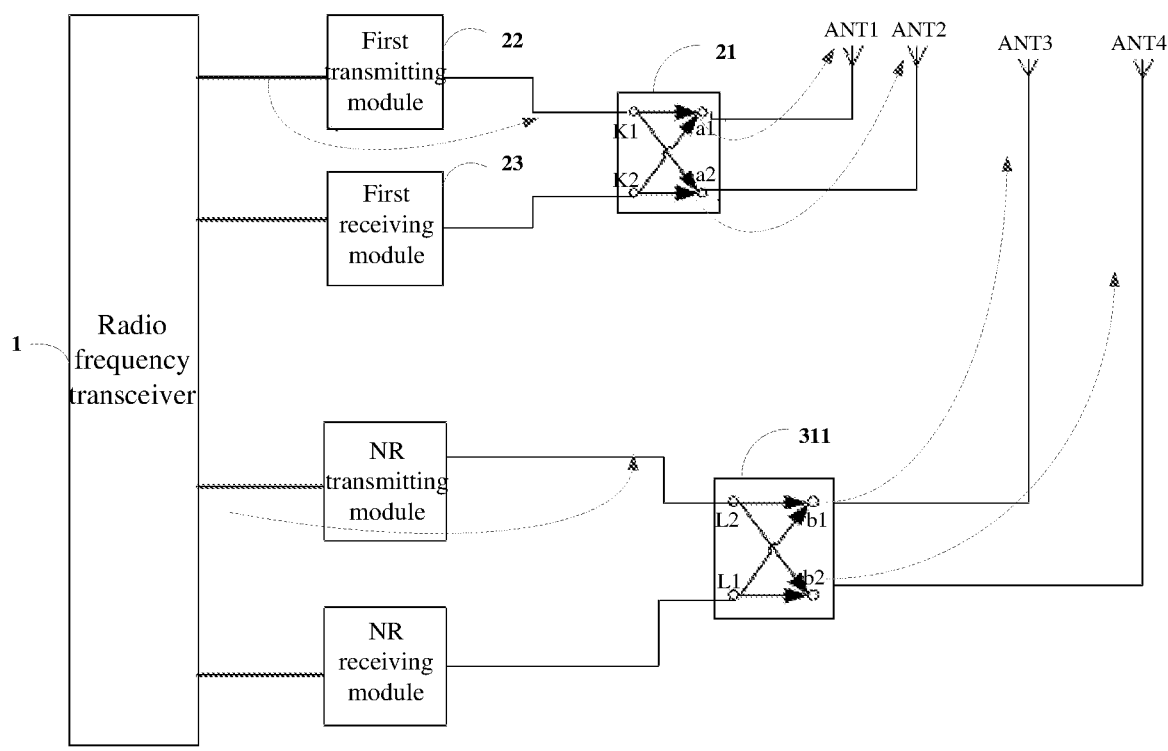
FIG. 4 is a schematic structural diagram 4 of a network radio frequency structure according to an embodiment of the present application.

For example, the second radio frequency module 3 is an NR radio frequency module, the second transmitting module 32 may be an NR transmitting module, and the second receiving module 33 may be an NR receiving module. As shown in FIG. 4, the NR transmitting module is connected to the first interface L1 of the second DPDT switch 311, the first contact b1 of the second DPDT switch 311 is connected to the third antenna ANT3, the NR receiving module is connected to the second interface L2 of the second DPDT switch 311, and the second contact b2 of the second DPDT switch 311 is connected to the fourth antenna ANT4. A signal sent by the radio frequency transceiver 1 passes through the NR transmitting module and the second DPDT switch 311 and is sent though ANT3 and ANT4.

As shown in FIG. 4, 2T4R of SRS signals includes two channels of SRS signals, a first channel of SRS signal passes through the first transmitting module 22 and the first DPDT switch 21, and is sent through ANT1 and ANT2. A second channel of SRS signal passes through the NR transmitting module and the second DPDT switch 311, and is sent through ANT3 and ANT4. In this way, the network radio frequency structure implements 2T4R of SRS signals. It should be noted that the first transmitting module 22 and the NR radio frequency module need to work simultaneously for the first channel of SRS signal and the second channel of SRS signal, that is, while the first transmitting module 22 transmits the first channel of SRS signal, the NR radio frequency module transmits the second channel of SRS signal.

For 1T4R of an SRS signal, the SRS signals need to be sent at a preset time sequence. Optionally, as shown in FIG. 4, through the NR transmitting module and the switching of the second DPDT switch 311, the SRS signal is transmitted to ANT3 and ANT4 and is sent through ANT3 and ANT4; transmission of an SRS signal by the NR radio frequency module is stopped; and through the first transmitting module 22 and the switching of the first DPDT switch 21, the SRS signal is transmitted to ANT1 and ANT2 and sent through ANT1 and ANT2. In this way, the network radio frequency structure implements the 1T4R function of an SRS signal in general.

In this embodiment, the first switch unit is set as a DPDT switch, and an externally connected 5G transmitting module and two DPDT switches may be configured to perform 2T4R and 1T4R functions of SRS signals, which effectively reduces the number of radio frequency amplifier components, channel switches, and antennas, thereby reducing costs. Compared with the 3P3T switch or the DP4T switch, switch insertion losses are reduced, thereby improving sensitivity of the radio frequency structure. This can greatly improve the overall performance of the network radio frequency structure.

Figure 5:
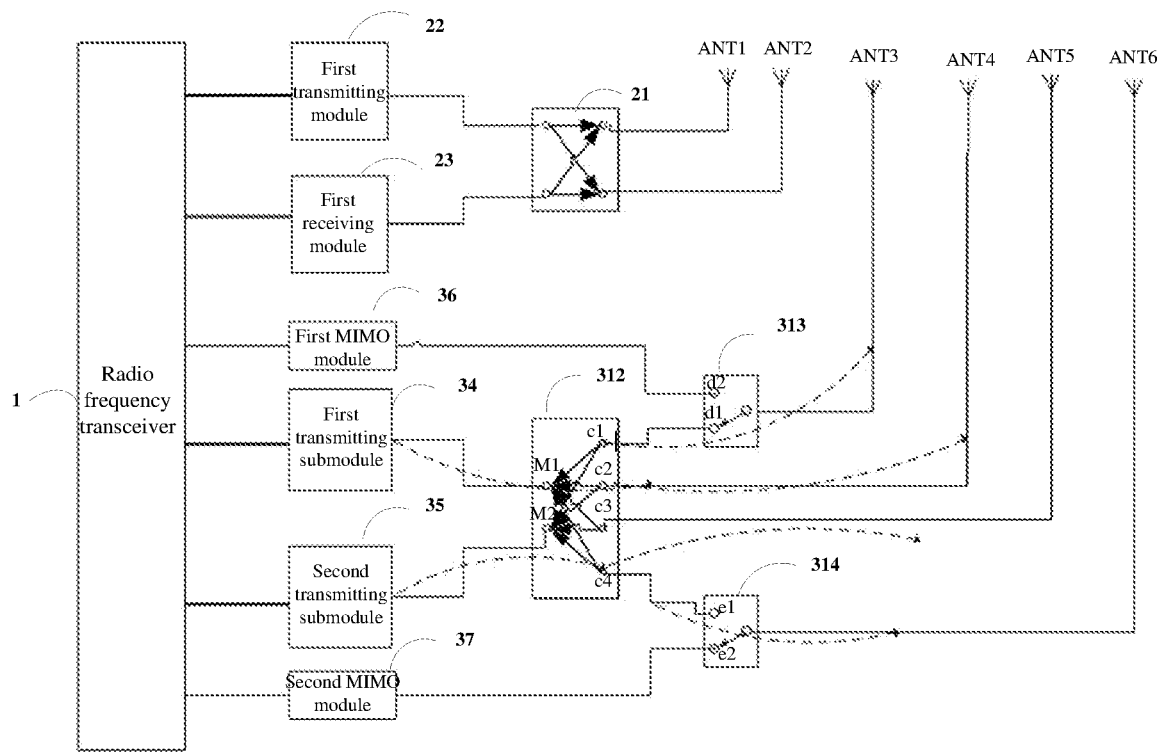
FIG. 5 is a schematic structural diagram 5 of a network radio frequency structure according to an embodiment of the present application.

In form 2, as shown in FIG. 5, optionally, the first switch unit 31 includes:
a DP4T switch 312; a first single pole double throw (SPDT) switch 313 connected to a first contact of the DP4T switch 312, where the first SPDT switch 313 is connected to the third antenna; and a second SPDT switch 314 connected to a fourth contact of the DP4T switch 312, where the second SPDT switch 314 is connected to a sixth antenna; where a second contact of the DP4T switch 312 is connected to the fourth antenna, and a third contact of the DP4T switch 312 is connected to the fifth antenna.

Optionally, the second radio frequency module 3 includes: a first transmitting submodule 34, connected to the first interface of the DP4T switch 312; a second transmitting submodule 35, connected to a second interface of the DP4T switch 312; a first multiple-input multiple-output (MIMO) module 36, connected to the first SPDT switch 313; and a second MIMO module 37, connected to the second SPDT switch 314.

As shown in FIG. 5, the first transmitting submodule 34 is connected to the first interface M1 of the DP4T switch 312, and the second transmitting submodule 35 is connected to the second interface M2 of the DP4T switch 312. The first contact c1 of the DP4T switch 312 is connected to the first contact d1 of the first SPDT switch 313, and the interface of the first SPDT switch 313 is connected to ANT3. The second contact c2 of the DP4T switch 312 is connected to ANT4, and the third contact c3 of the DP4T switch 312 is connected to ANT5. The fourth contact c4 of the DP4T switch 312 is connected to the first contact e1 of the second SPDT switch 314, and the interface of the second SPDT switch 314 is connected to ANT6. The first MIMO module 36 is connected to the second contact d2 of the first SPDT switch 313, and the second MIMO module 37 is connected to the second contact e2 of the second SPDT switch 314.

The second radio frequency module 3 may be an NR radio frequency module, the first transmitting submodule 34 may be a first NR transmitting module, the second transmitting submodule 35 may be a second NR transmitting module, the first MIMO module 36 may be a first NR MIMO module, and the second MIMO module 37 may be a second NR MIMO module.

As shown in FIG. 5, for 2T4R of SRS signals, the first channel of SRS signal passes through the first transmitting submodule 34 and the DP4T switch 312, is transmitted to ANT3 through the first SPDT switch 313, is transmitted to ANT4 through the second contact of the DP4T switch 312, and is sent by ANT3 and ANT4. The second channel of SRS signal passes through the second transmitting submodule 35 and the DP4T switch 312, is transmitted to ANT6 through the second SPDT switch 314, is transmitted to ANT5 through the third contact of the DP4T switch 312, and is sent by ANT5 and ANT6. In this way, the network radio frequency structure implements the 2T4R function of SRS signals.

Figure 6:
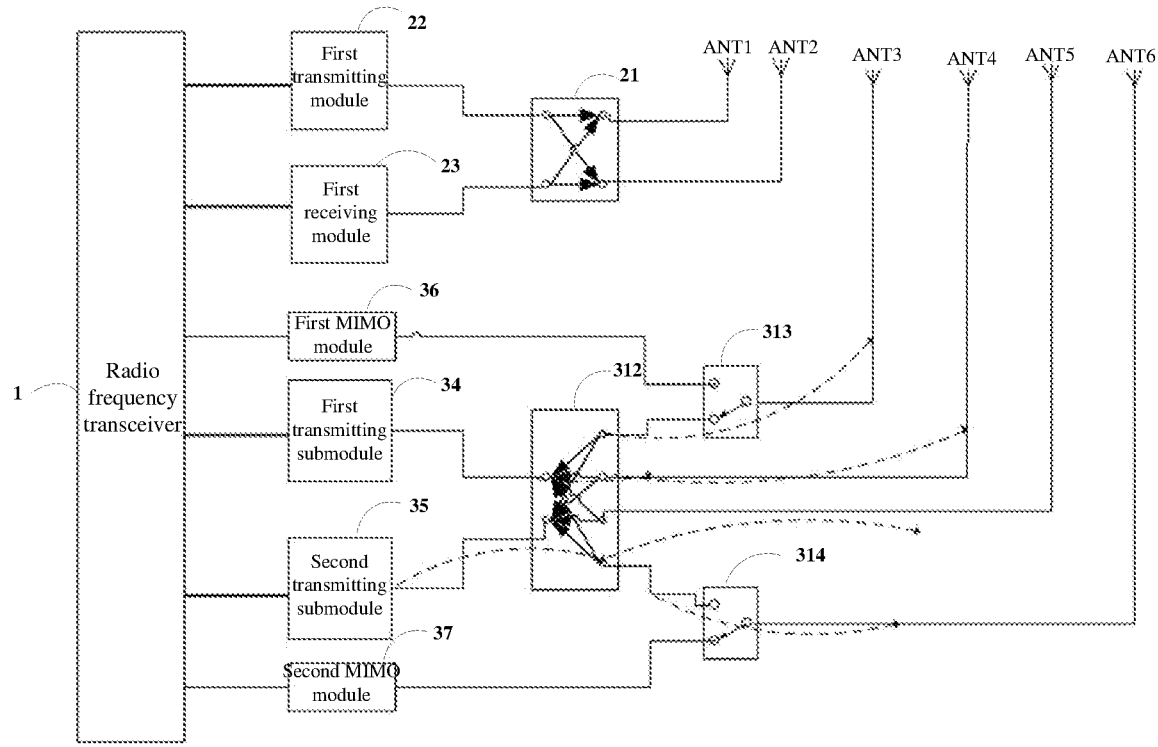
FIG. 6 is a schematic structural diagram 6 of a network radio frequency structure according to an embodiment of the present application.

As shown in FIG. 6, for 1T4R of SRS signals, through the second transmitting submodule 35 and the switching of the DP4T switch 312, the SRS signal passes through the first SPDT switch 313 and the second SPDT switch 314, and is transmitted to ANT3, ANT4, ANT5, and ANT6. In this way, the network radio frequency structure implements the 1T4R function of an SRS signal.

In this embodiment, the first switch unit is set as a structure of a DP4T switch and two SPDT switches to replace a 3P3T switch or a DP4T switch, to reduce switch insertion losses, and therefore improve the sensitivity of the radio frequency structure. In addition, switch logic is simple and the layout is flexible. At the same time, the SRS function and the antenna switching function of the network radio frequency structure can be performed.

An embodiment of the present application further provides an electronic device, including the foregoing network radio frequency structure. A person skilled in the art may understand that, the electronic device may be a mobile phone, and may also be applied to another electronic device that has a display screen, such as a tablet computer, an e-book reader, a moving picture experts group audio layer III (MP3) player, a moving picture experts group audio layer IV (MP4) player, a laptop computer, a vehicle-mounted computer, a desktop computer, a set top box, a smart television, and a wearable device that all fall within the protection scope of the embodiments of the present application.

Figure 7:
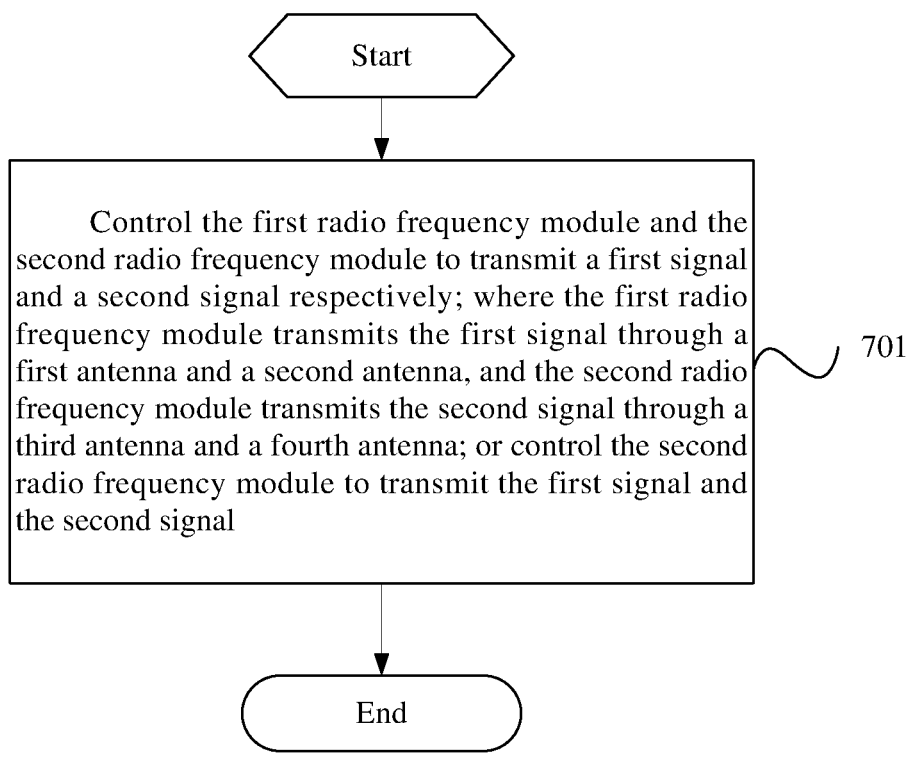
FIG. 7 is a schematic flowchart of a radio frequency control method according to an embodiment of the present application.

As shown in FIG. 7, an embodiment of the present application further provides a radio frequency control method, applied to an electronic device. The electronic device includes a first radio frequency module and a second radio frequency module, and the method includes the following steps.

Step 701: Control the first radio frequency module and the second radio frequency module to transmit a first signal and a second signal respectively; where the first radio frequency module transmits the first signal through a first antenna and a second antenna, and the second radio frequency module transmits the second signal through a third antenna and a fourth antenna; or control the second radio frequency module to transmit the first signal and the second signal.

The first signal and the second signal may be a same signal or different signals. The first radio frequency module may be an LTE radio frequency module, and the second radio frequency module may be an NR radio frequency module.

During signal transmission of the electronic device, standalone and non-standalone NR bands need to support a technology of 2T4R (2 channels of transmissions and 4 channels of reception) or 1T4R (1 channel of transmission and 4 channels of reception) that transmits SRSs by turns through antennas. Since 2T4R of SRS signals includes two channels of SRS signals, a first signal and a second signal are signals of a same type with different transmission channels. Optionally, the first channel of SRS signal (that is, the first signal) is transmitted by the first radio frequency module through the first antenna and the second antenna, and the second channel of SRS signal (that is, the second signal) is transmitted by the second radio frequency module through the third antenna and the fourth antenna; or the two channels of SRS signals are both transmitted by the second radio frequency module, so that 2T4R of SRS signals is implemented.

For 1T4R of SRS signals, since only one channel of SRS signal needs to be sent, when the second radio frequency module is controlled to transmit the first signal and the second signal, the first signal and the second signal are a same signal. The SRS signal may be sent by the second radio frequency module through multiple antennas; or the SRS signal may be sent by the first radio frequency module through the first antenna and the second antenna, and the SRS signal is sent by the second radio frequency module through the third antenna and the fourth antenna. It should be noted that the transmission of the SRS signal by the first radio frequency module and the second radio frequency module needs to be performed in a preset time sequence. In this way, 1T4R of an SRS signal is implemented.

In the embodiments of the present application, signals are transmitted in multiple modes, and network radio frequency sensitivity of the electronic device is improved. Besides, in the method, the electronic device can perform 2T4R and 1T4R functions of SRS signals.

Optionally, the controlling the first radio frequency module and the second radio frequency module to transmit the first signal and the second signal respectively includes:

controlling the first radio frequency module and the second radio frequency module to transmit the first signal and the second signal respectively at a first moment; or controlling the first radio frequency module and the second radio frequency module to transmit, according to a preset time sequence, the first signal and the second signal respectively.

That the first radio frequency module and the second radio frequency module transmit the first signal and the second signal respectively at the first moment means: while the first radio frequency module transmits the first signal, the second radio frequency module transmits the second signal.

For 2T4R of SRS signals, for example, the first signal is the first channel of SRS signal and the second signal is the second channel of SRS signal. As shown in FIG. 4, the first radio frequency module sends the first channel of SRS signal to the first antenna and the second antenna, and the first channel of SRS signal is sent by the first antenna and the second antenna; and the second radio frequency module sends the second channel of SRS signal to the third antenna and the fourth antenna, and the second channel of SRS signal is sent by the third antenna and the fourth antenna. In addition, the first radio frequency module and the second radio frequency module send the first channel of SRS signal and the second channel of SRS signal at the same moment, so that 2T4R of the SRS signals is implemented.

For 1T4R of an SRS signal, SRS signals need to be sent at a preset time sequence. Optionally, the controlling the first radio frequency module and the second radio frequency module to transmit, according to a preset time sequence, the first signal and the second signal respectively includes:

controlling the second radio frequency module to transmit the second signal; and after the second radio frequency module transmits the second signal, controlling the first radio frequency module to transmit the first signal.

For 1T4R of an SRS signal, for example, the first signal is the first channel of SRS signal and the second signal is the second channel of SRS signal. As shown in FIG. 4, although two transmitting modules are configured to perform the 1T4R function of a signal, in this solution, one transmitting module (that is, the second radio frequency module) is configured to transmit the second signal to the third antenna and the fourth antenna, and then this channel of transmission needs to be stopped, and the other transmitting module (that is, the first radio frequency module) is configured to transmit the first signal to the first antenna and the second antenna, thereby implementing the 1T4R function of the SRS signal in general.

Optionally, the second radio frequency module includes the first transmitting submodule and the second transmitting submodule, and the controlling the second radio frequency module to transmit the first signal and the second signal includes:

controlling the first transmitting submodule and the second transmitting submodule to transmit a first signal and a second signal respectively; where the first transmitting submodule transmits the first signal through a third antenna and a fourth antenna, and the second transmitting submodule transmits the second signal through a fifth antenna and a sixth antenna.

For example, the first signal is the first channel of SRS signal and the second signal is the second channel of SRS signal. As shown in FIG. 5, the first transmitting submodule sends the first channel of SRS signal to the third antenna and the fourth antenna, and the first channel of SRS signal is sent by the third antenna and the fourth antenna; and the second transmitting submodule sends the second channel of SRS signal to the fifth antenna and the sixth antenna, and the second channel of SRS signal is sent by the fifth antenna and the sixth antenna. In this way, the two channels of SRS signals are both transmitted by the second radio frequency module, to implement the 2T4R function of SRS signals.

Optionally, the second radio frequency module includes the first transmitting submodule and the second transmitting submodule, and the controlling the second radio frequency module to transmit the first signal and the second signal includes:

controlling the second transmitting submodule to transmit the first signal and the second signal; where the second transmitting submodule transmits the first signal through the third antenna and the fourth antenna, and transmits the second signal through the fifth antenna and the sixth antenna.

In this embodiment, the first signal and the second signal are a same signal. For example, the signal is an SRS signal. This solution is applicable to 1T4R of an SRS signal, that is, only one transmitting module is required to transmit the SRS signal. As shown in FIG. 6, the second transmitting submodule sends the SRS signal to the third antenna, the fourth antenna, the fifth antenna, and the sixth antenna, where a signal sent by the third antenna and the fourth antenna is considered to be the first signal, and a signal sent by the fifth antenna and the sixth antenna is considered to be the second signal. It should be noted that for 1T4R of the SRS signal, the first signal and the second signal are a same signal.

In the embodiments of the present application, signals are transmitted in multiple modes, and network radio frequency sensitivity of the electronic device is improved. An externally connected 5G transmitting module can be configured to perform the 2T4R and 1T4R functions of the SRS signals, effectively reducing the costs.

Figure 8:
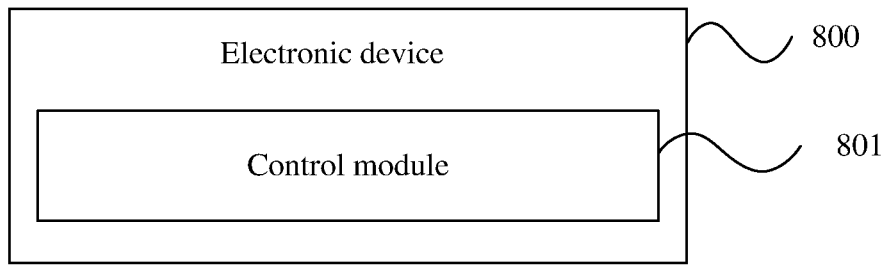
FIG. 8 is a schematic structural diagram of an electronic device according to an embodiment of the present application.

As shown in FIG. 8, an embodiment of the present application further provides an electronic device 800, including a first radio frequency module and a second radio frequency module, and further including:

a control module 801, configured to control the first radio frequency module and the second radio frequency module to transmit a first signal and a second signal respectively; where the first radio frequency module transmits the first signal through a first antenna and a second antenna, and the second radio frequency module transmits the second signal through a third antenna and a fourth antenna; or control the second radio frequency module to transmit the first signal and the second signal.

Optionally, the control module 801 includes:

a first control unit, configured to control the first radio frequency module and the second radio frequency module to transmit the first signal and the second signal respectively at a first moment; or control the first radio frequency module and the second radio frequency module to transmit, according to a preset time sequence, the first signal and the second signal respectively.

Optionally, the first control unit is configured to:

control the second radio frequency module to transmit the second signal; and after the second radio frequency module transmits the second signal, control the first radio frequency module to transmit the first signal.

Optionally, the second radio frequency module includes a first transmitting submodule and a second transmitting submodule; and the control module 801 includes:

a second control unit, configured to control the first transmitting submodule and the second transmitting submodule to transmit the first signal and the second signal respectively;

where the first transmitting submodule transmits the first signal through the third antenna and the fourth antenna; and the second transmitting submodule transmits the second signal through the fifth antenna and the sixth antenna.

Optionally, the second radio frequency module includes a first transmitting submodule and a second transmitting submodule; and the control module 801 includes:

a third control unit, configured to control the second transmitting submodule to transmit the first signal and the second signal;

where the second transmitting submodule transmits the first signal through the third antenna and the fourth antenna, and transmits the second signal through the fifth antenna and the sixth antenna.

The electronic device provided in this embodiment of the present application can implement the processes that are implemented by the electronic device in the foregoing method embodiments. To avoid repetition, details are not described herein again.

In the embodiments of the present application, signals are transmitted in multiple modes, and network radio frequency sensitivity of the electronic device is improved. An externally connected 5G transmitting module can be configured to perform the 2T4R and 1T4R functions of the SRS signals, effectively reducing the costs.

Figure 9:
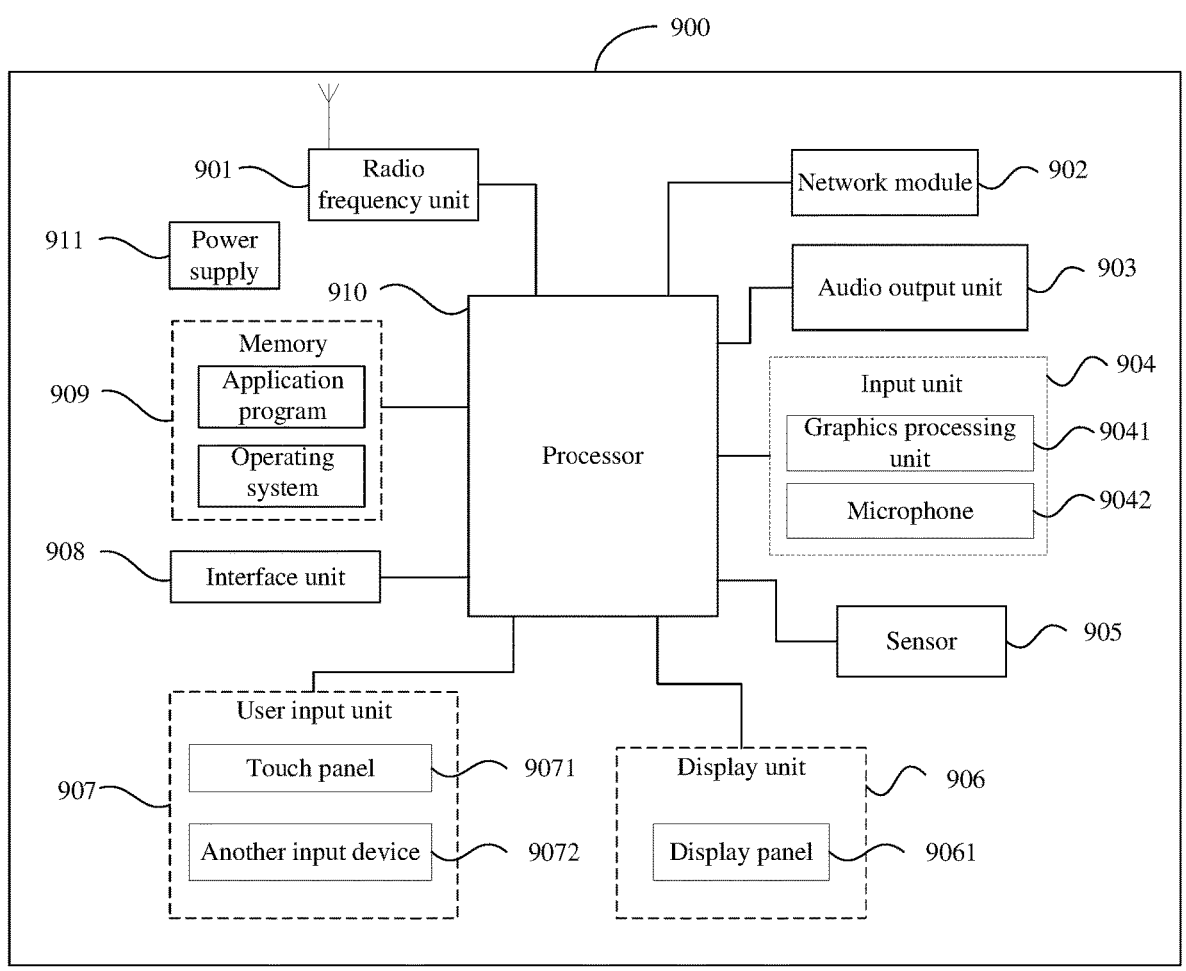
FIG. 9 is a schematic diagram of a hardware structure of an electronic device according to another embodiment of the present application.

FIG. 9 is a schematic diagram of a hardware structure of an electronic device according to embodiments of the present application.

The electronic device 900 includes but is not limited to components such as a radio frequency unit 901, a network module 902, an audio output unit 903, an input unit 904, a sensor 905, a display unit 906, a user input unit 907, an interface unit 908, a memory 909, a processor 910, and a power supply 911. A person skilled in the art may understand that the structure of the electronic device shown in FIG. 9 constitutes no limitation on the electronic device. The electronic device may include more or fewer components than those shown in the figure, or a combination of some components, or an arrangement of different components. In this embodiment of the present disclosure, the electronic device includes, but is not limited to, a mobile phone, a tablet computer, a notebook computer, a palmtop computer, a vehicle-mounted terminal, a wearable device, a pedometer, or the like.

The processor 910 is configured to control the first radio frequency module and the second radio frequency module to transmit a first signal and a second signal respectively; where the first radio frequency module transmits the first signal through a first antenna and a second antenna, and the second radio frequency module transmits the second signal through a third antenna and a fourth antenna; or control the second radio frequency module to transmit the first signal and the second signal.

In the embodiments, signals are transmitted in multiple modes, and network radio frequency sensitivity of the electronic device is improved. An externally connected 5G transmitting module can be configured to perform the 2T4R and 1T4R functions of the SRS signals, effectively reducing the costs.

It should be understood that, in this embodiment of the present application, the radio frequency unit 901 may be configured to receive and send information or receive and send a signal in a call process. For example, after downlink data from a base station is received, the processor 910 processes the downlink data. In addition, uplink data is sent to the base station. Generally, the radio frequency unit 901 includes, but not limited to, an antenna, at least one amplifier, a transceiver, a coupler, a low noise amplifier, a duplexer, and the like. In addition, the radio frequency unit 901 may further communicate with another device by using a wireless communications system and network.

The electronic device provides users with wireless broadband Internet access through the network module 902, for example, helps users receive and send e-mails, browse web pages, and access streaming media.

The audio output unit 903 can convert audio data received by the radio frequency unit 901 or the network module 902 or stored in the memory 909 into an audio signal, and output the audio signal into sound. Moreover, the audio output unit 903 can further provide audio output related to a specific function performed the electronic device 900 (for example, call signal receiving sound and message receiving sound). The audio output unit 903 includes a loudspeaker, a buzzer, a receiver, and the like.

The input unit 904 is configured to receive audio or video signals. The input unit 904 may include a graphics processing unit (GPU) 9041 and a microphone 9042. The graphics processing unit 9041 is configured to process image data of a static picture or a video obtained by an image capturing device (for example, a camera) in a video capturing mode or an image capturing mode. A processed image frame may be displayed on the display unit 906. The image frame processed by the graphics processing unit 9041 may be stored in the memory 909 (or another storage medium) or sent by using the radio frequency unit 901 or the network module 902. The microphone 9042 may receive sound and can process such sound into audio data. The audio data obtained through processing may be converted, in a telephone call mode, into a format that may be sent to a mobile communication base station via the radio frequency unit 901 for output.

The electronic device 900 further includes at least one sensor 905, for example, a light sensor, a motor sensor, and another sensor. For example, the light sensor includes an ambient light sensor and a proximity sensor. The ambient light sensor can adjust brightness of a display panel 9061 according to ambient light brightness. The proximity sensor can switch off the display panel 9061 and/or backlight when the electronic device 900 moves close to an ear. As a motion sensor, an accelerometer sensor can detect magnitude of acceleration in various directions (usually three axes), can detect magnitude and the direction of gravity when stationary, can be configured to identify electronic device postures (such as switching between a landscape mode and a portrait mode, related games, and magnetometer posture calibration), can perform functions related to vibration identification (such as a pedometer and a knock), and the like. The sensor 905 may further include a fingerprint sensor, a pressure sensor, an iris sensor, a molecular sensor, a gyroscope, a barometer, a hygrometer, a thermometer, an infrared sensor, or the like. Details are not described herein.

The display unit 906 is configured to display information entered by a user or information provided for a user. The display unit 906 may include the display panel 9061, and the display panel 9061 may be configured in a form of a liquid crystal display (LCD), an organic light-emitting diode (OLED), or the like.

The user input unit 907 can be configured to receive entered number or character information, and generate key signal input related to user settings and function control of the electronic device. For example, the user input unit 907 includes a touch panel 9071 and another input device 9072. The touch panel 9071, also referred to as a touch screen, may collect a touch operation of a user on or near the touch panel (for example, the user uses any suitable object or accessory such as a finger or a stylus to operate on the touch panel 9071 or near the touch panel 9071). The touch panel 9071 can include two parts: a touch detection apparatus and a touch controller. The touch detection apparatus detects a touch position of a user, detects a signal brought by a touch operation, and transmits the signal to the touch controller. The touch controller receives touch information from the touch detection apparatus, converts the touch information into touch point coordinates, sends the touch point coordinates to the processor 910, and receives and executes a command sent by the processor 910. In addition, the touch panel 9071 may be implemented by various types, such as a resistive type, a capacitive type, an infrared type, a surface acoustic wave type, or the like. The user input unit 907 may further include another input device 9072 in addition to the touch panel 9071. For example, the another input device 9072 may include, but is not limited to, a physical keyboard, function keys (such as a volume control key and a switch key), a trackball, a mouse, and a joystick. Details are not described herein.

Optionally, the touch panel 9071 can cover the display panel 9061. When detecting a touch operation on or near the touch panel, the touch panel 9071 transmits the touch operation to the processor 910 to determine a type of a touch event. Then the processor 910 provides corresponding visual output on the display panel 9061 based on the type of the touch event. Although in FIG. 9, the touch panel 9071 and the display panel 9061 are configured as two independent components to implement input and output functions of the electronic device, in some embodiments, the touch panel 9071 and the display panel 9061 can be integrated to implement the input and output functions of the electronic device. Details are not limited herein.

The interface unit 908 is an interface for connecting an external apparatus and the electronic device 900. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 908 can be configured to receive input from an external apparatus (for example, data information and power) and transmit the received input to one or more elements in the electronic device 900, or can be configured to transmit data between the electronic device 900 and the external apparatus.

The memory 909 may be used to store software programs and various data. The memory 909 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 909 may include a high-speed random access memory, and may further include a non-volatile memory, for example, at least one magnetic disk storage device, a flash memory device, or another volatile solid-state storage device.

The processor 910 is a control center of the electronic device and connects all parts of the electronic device using various interfaces and circuits. By running or executing software programs and/or modules stored in the memory 909 and by calling data stored in the memory 909, the processor 910 implements various functions of the electronic device and processes data, thus performing overall monitoring on the electronic device. The processor 910 may include one or more processing units. Optionally, the processor 910 may integrate an application processor and a modem processor. The application processor mainly deals with an operating system, a user interface, an application, and the like. The modem processor mainly deals with wireless communication. It can be understood that, alternatively, the modem processor may not be integrated into the processor 910.

The electronic device 900 may further include the power supply 911 (such as a battery) supplying power to each component. For example, the power supply 911 may be logically connected to the processor 910 by using a power management system, so as to implement functions such as charging management, discharging management and power consumption management by using the power management system.

In addition, the electronic device 900 includes some functional modules not shown. Details are not described herein.

For example, an embodiment of the present application further provides an electronic device, including a processor, a memory, and a computer program stored in the memory and executable on the processor. When the computer program is executed by the processor, each process of the foregoing embodiments of the radio frequency control method is implemented, and a same technical effect can be achieved. To avoid repetition, details are not described herein.

An embodiment of the present application further provides a non-transitory computer readable storage medium. The non-transitory computer readable storage medium stores a computer program, and when the computer program is executed by a processor, the processes of the foregoing embodiments of the radio frequency control method are implemented, and same technical effects can be achieved. To avoid repetition, details are not described herein again. The non-transitory computer readable storage medium may be a read-only memory (ROM), a random access memory (RAM), a magnetic disk, a compact disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the foregoing descriptions of the implementations, a person skilled in the art may clearly understand that the foregoing method embodiments may be implemented by using software and a required universal hardware platform, or may be implemented by using hardware. However, in many cases, the former is a better implementation. Based on such an understanding, the technical solutions of the present application essentially or the part contributing to the prior art may be implemented in a form of a software product. The computer software product is stored in a nonvolatile storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present application.

It may be understood that some embodiments of the present application may be implemented by hardware, software, firmware, middleware, microcode, or a combination thereof. For implementation with hardware, the module, unit, submodule, subunit, and the like may be implemented in one or more application specific integrated circuits (ASIC), a digital signal processor (DSP), a digital signal processing device (DSPD), a programmable logic device (PLD), a field-programmable gate array (FPGA), general processors, controllers, micro-controllers, micro-processors, and other electronic units for implementing the functions of the present application, or their combinations.

For software implementation, the technology described in the embodiments of the present application may be implemented by using a module (for example, a process or a function) that performs the function in the embodiments of the present application. Software code may be stored in a memory and executed by a processor. The memory may be implemented inside or outside the processor.

Therefore, the objectives of the present application may also be achieved by running a program or a set of programs on any computing apparatus. The computing apparatus may be a well-known general-purpose apparatus. Therefore, the objective of the present application may also be achieved only by providing a program product including program code for implementing the method or the apparatus. In other words, such a program product also constitutes the present application, and a nonvolatile storage medium storing such a program product also constitutes the present application. Obviously, the nonvolatile storage medium may be any well-known nonvolatile storage medium or any nonvolatile storage medium to be developed in the future. It should also be noted that in the apparatus and method of the present disclosure, apparently, the components or steps may be divided and/or recombined. These division and/or recombination should be considered as equivalent solutions of the present application. Moreover, the steps for performing the foregoing series of processing may be performed naturally in a chronological order according to a described sequence, but do not necessarily need to be performed in the chronological order, and some steps may be performed in parallel or independently.

The embodiments of the present application are described above with reference to the accompanying drawings, but the present application is not limited to the foregoing implementations. The foregoing implementations are merely exemplary instead of restrictive. Under enlightenment of the present application, a person of ordinary skill in the art may make many forms without departing from the aims of the present application and the protection scope of claims, all of which fall within the protection of the present application.

What is claimed is:

1. A network radio frequency structure, applied to an electronic device, comprising:
   a radio frequency transceiver;
   a first radio frequency module connected to the radio frequency transceiver, wherein the first radio frequency module is connected to a first antenna and a second antenna through a first double pole double throw (DPDT) switch; and a second radio frequency module connected to the radio frequency transceiver, wherein the second radio frequency module is connected to a third antenna and a fourth antenna through a first switch unit; wherein the first radio frequency module comprises: a first transmitting module and a first receiving module, the first transmitting module is connected to a first interface of the first DPDT switch, and the first receiving module is connected to a second interface of the first DPDT switch;

wherein the first switch unit comprises:

a double pole four throw (DP4T) switch;

a first single pole double throw (SPDT) switch connected to a first contact of the DP4T switch, wherein the first SPDT switch is connected to the third antenna; and a second SPDT switch connected to a fourth contact of the DP4T switch, wherein the second SPDT switch is connected to a sixth antenna; wherein a second contact of the DP4T switch is connected to the fourth antenna, and a third contact of the DP4T switch is connected to a fifth antenna.

2. The network radio frequency structure according to claim 1, wherein the second radio frequency module comprises:

a first transmitting submodule, connected to a first interface of the DP4T switch;

a second transmitting submodule, connected to a second interface of the DP4T switch;

a first multiple-input multiple-output (MIMO) module, connected to the first SPDT switch; and a second MIMO module, connected to the second SPDT switch.

3. An electronic device, comprising the network radio frequency structure according to claim 1.

* * * * *